US011435219B2

(12) United States Patent
Ploss et al.

(10) Patent No.: US 11,435,219 B2
(45) Date of Patent: Sep. 6, 2022

(54) METHOD FOR ASCERTAINING AT LEAST ONE PIPE WALL RESONANCE FREQUENCY, AS WELL AS CLAMP-ON, ULTRASONIC, FLOW MEASURING DEVICE (71) Applicant: Endress + Hauser Flowtec AG, Reinach (CH)

(72) Inventors: Peter Ploss, Erlangen (DE); Stefan Rupitsch, Nuremberg (DE); Michal Bezdek, Aesch (CH); Thomas Frohlich, Munchenstein (CH); Beat Kissling, Reinach (CH)

(73) Assignee: ENDRESS+HAUSER FLOWTEC AG, Reinach (CH)

( * ) Notice: Subject to any disclaimer, the term of this patent is extended or adjusted under 35 U.S.C. 154(b) by 23 days.

(21) Appl. No.: 15/569,178

(22) PCT Filed: Apr. 26, 2016

(86) PCT No.: PCT/EP2016/059308
§ 371 (c)(1),
(2) Date: Oct. 25, 2017

(87) PCT Pub. No.: WO2016/184647
PCT Pub. Date: Nov. 24, 2016

(65) Prior Publication Data
US 2018/0149511 A1 May 31, 2018

(30) Foreign Application Priority Data
May 18, 2015 (DE) ............. 10 2015 107 752.3

(51) Int. Cl.
*G01F 25/10* (2022.01)
*G01F 1/667* (2022.01)
(Continued)

(52) U.S. Cl.
CPC .............. *G01F 25/10* (2022.01); *G01F 1/662* (2013.01); *G01F 1/667* (2013.01); *G01F 15/024* (2013.01);
(Continued)

(58) Field of Classification Search
CPC ................. G01M 3/045; G01M 3/165; G01F 23/296–2968; G01N 2291/02836;
(Continued)

(56) References Cited

U.S. PATENT DOCUMENTS 3,732,726 A 5/1973 Ferber
4,735,097 A * 4/1988 Lynnworth .......... G01N 29/343
73/861.28
(Continued)

FOREIGN PATENT DOCUMENTS

CN 103189719 A 7/2013
DE 198 18 053 A1 10/1998
(Continued)

OTHER PUBLICATIONS

Article Resonators and Q values by JohanLiljencrants from website http://www.fonema.se/qval/qval.htm (Year: 2002).*
(Continued)

*Primary Examiner* — Alexander A Mercado
*Assistant Examiner* — Monica S Young
(74) *Attorney, Agent, or Firm* — Kelly J. Smith; Endress Hauser (USA) Holding Inc.

(57) ABSTRACT

A method for ascertaining at least one pipe wall resonance frequency of a pipeline in the region of a measuring point by means of a field device of process measurements technology having at least a first ultrasonic transducer, which is placed on the pipeline at the measuring point, comprising steps as follows: providing a first transfer function $U_{transducer}(f)$ at least of the first or a plurality of ultrasonic transducers
(Continued)

located in the region of the measuring point; ascertaining a received spectrum $U_{rec}(f)$ from a received signal $U_{rec}(t)$ after transmission of an ultrasonic signal; ascertaining a second transfer function $U_{measuring\ point}(f)$ from the first transfer function $U_{transducer}(f)$ of the first or the plurality of ultrasonic transducers and from the received spectrum $u_{rec}(f)$, wherein the second transfer function $U_{measuring\ point}(f)$ is characteristic for the measuring point; and ascertaining the at least one pipe wall resonance frequency $f_{res}$, especially a plurality of resonance frequencies, in the region of the measuring point by evaluating the second transfer function $U_{measuring\ point}(f)$ from step III, as well as a clamp-on, ultrasonic, flow measuring device, a method for ascertaining flow, a method for ascertaining a change of the measuring point and an identification device.

14 Claims, 3 Drawing Sheets

(51) Int. Cl.
  *G01F 15/02* (2006.01)
  *G01F 1/66* (2022.01)
  *G01N 29/12* (2006.01)
(52) U.S. Cl.
  CPC ..... *G01N 29/12* (2013.01); *G01N 2291/2634* (2013.01)
(58) Field of Classification Search
  CPC ......... Y10S 367/908; B41J 2002/17583; B41J 73/29; B41J 367/908; B41J 340/621
  USPC ...................................................... 73/1, 290
  See application file for complete search history.

(56) References Cited

U.S. PATENT DOCUMENTS

| | | | | |
|---|---|---|---|---|
| 4,930,358 | A * | 6/1990 | Motegi | G01F 1/662 73/861.28 |
| 5,280,728 | A * | 1/1994 | Sato | G01F 1/667 73/861.28 |
| 5,650,571 | A * | 7/1997 | Freud | G01F 1/667 73/861.06 |
| 6,062,091 | A * | 5/2000 | Baumoel | G01F 1/662 73/861.27 |
| 6,405,603 | B1 * | 6/2002 | Baumoel | G01F 1/74 73/592 |
| 9,557,201 | B2 * | 1/2017 | Drachmann | G01F 1/662 |
| 10,261,051 | B2 * | 4/2019 | Kishiro | G01F 1/66 |
| 2004/0069069 | A1 | 4/2004 | Gysling et al. | |
| 2004/0123666 | A1 * | 7/2004 | Ao | G10K 11/165 73/861.28 |
| 2005/0011278 | A1 | 1/2005 | Brown et al. | |
| 2006/0022680 | A1 * | 2/2006 | Suginouchi | G01F 23/2962 324/635 |
| 2006/0156828 | A1 * | 7/2006 | Konzelmann | G01F 5/00 73/861.25 |
| 2008/0245147 | A1 * | 10/2008 | Snieder | G01N 9/002 73/32 A |
| 2011/0271769 | A1 * | 11/2011 | Kippersund | G01F 1/42 73/861.28 |
| 2011/0303012 | A1 * | 12/2011 | Amundsen | G01B 7/066 73/579 |
| 2012/0055239 | A1 * | 3/2012 | Sinha | G01F 1/74 73/61.79 |
| 2012/0055253 | A1 * | 3/2012 | Sinha | G01N 29/348 73/622 |
| 2012/0055264 | A1 * | 3/2012 | Sinha | G01F 1/663 73/861.25 |
| 2013/0067992 | A1 * | 3/2013 | Sinha | G01F 1/666 73/24.04 |
| 2018/0120269 | A1 * | 5/2018 | Sinha | G01N 29/343 |

FOREIGN PATENT DOCUMENTS

| | | |
|---|---|---|
| DE | 10 2015 107 752 A1 | 11/2016 |
| WO | 2016/184647 A1 | 11/2016 |

OTHER PUBLICATIONS

German Search Report, German PTO, Munich, dated Feb. 19, 2016.
International Search Report, EPO, The Netherlands, dated Sep. 1, 2016.
Lenoir et al., "Study of Lamb waves based upon the frequency and angular derivatives of the phase of the reflection coefficient", J. Acoust. Soc. Am., vol. 94, No. 1, Jul. 1993, pp. 330-343.
Karim et al., "Inversion of leaky Lamb wave data by simplex algorithm", J. Acoust. Soc. Am., vol. 88, No. 1, Jul. 1990, pp. 482-491.
Chinese Office Action in corresponding CN Application No. 201680028001.4, dated Dec. 9, 2019.

* cited by examiner

METHOD FOR ASCERTAINING AT LEAST ONE PIPE WALL RESONANCE FREQUENCY, AS WELL AS CLAMP-ON, ULTRASONIC, FLOW MEASURING DEVICE

TECHNICAL FIELD

The present invention relates to a method for ascertaining at least one pipe wall resonance frequency, as well as a clamp-on, ultrasonic, flow measuring device, a method for ascertaining a flow rate and/or a flow velocity, a method for ascertaining changes of a measuring point and a pipe identification device.

BACKGROUND DISCUSSION

Clamp-on, ultrasonic, flow measuring devices have been known for a long time. They can be operated according to the Doppler principle or according to the travel-time difference principle. Usually, the ultrasonic transducers of clamp-on, ultrasonic, flow measuring devices are placed externally on an existing pipeline and fixed or otherwise secured to the pipeline. An installation of the flow measuring device can, thus, occur without interruption of flow in the pipeline. A significant measurement uncertainty in the case of clamp-on flow measuring devices is, however, the pipeline and its unknown parameters. Thus, the inner diameter of the pipeline is known only as an average value; it can, however, deviate at the measuring point significantly from the average. Also, the sound-damping properties of the different wall materials of the pipeline, as well as internal accretion or hydroabbrasion can influence the accuracy of the flow measurement. For a long time, no suitable compensation has been available for these measuring-point-specific sources of error.

SUMMARY OF THE INVENTION

Starting from these considerations, it is an object of the present invention to provide a method assuring a more exact flow measurement, especially for clamp-on, ultrasonic, flow measuring devices.

Moreover, the invention enables the providing of a suitable clamp-on flow measuring device and a pipe wall identification device, with which pipeline parameters are ascertainable.

It has been found that a correction of the measured flow rate and/or a measured flow velocity can occur by ascertaining one or more pipe wall resonance frequencies.

A method of the invention relates to ascertaining at least one pipe wall resonance frequency fres of a pipeline in the region of a measuring point by means of a field device of process measurements technology having at least a first ultrasonic transducer, which is placed on the pipeline at the measuring point. The method includes the steps as follows:

I providing a first transfer function at least of the first or a plurality of ultrasonic transducers located in the region of the measuring point;

II ascertaining a received spectrum $U_{rec}(f)$ from a received signal $U_{rec}(t)$ after transmission of an ultrasonic signal;

III ascertaining a second transfer function from the first transfer function of the first or the plurality of ultrasonic transducers and from the received spectrum, wherein the second transfer function is characteristic for the measuring point; and IV ascertaining the pipe wall resonance frequencies in the region of the measuring point by evaluating the transfer function from step III.

The aforementioned transfer functions as well as also the received signal can be represented as amplitude spectra, e.g. sound level in decibel as a function of frequency.

The transfer function, which is characteristic for the measuring point, is essentially determined by the sound transmission behavior of the pipeline, as determined by clinging accretion or the like. The transfer function can, however, also include the transfer behavior of the measured medium in the case of sound damping media.

In step II, the registering of a received spectrum $U_{rec}(f)$ from a received signal $U_{rec}(t)$ occurs after the transmission of an ultrasonic signal. In such case, a signal $u_{rec}(t)$ is measured as a function of time and then the complex valued spectrum $U_{rec}(f)$ is calculated therefrom in the form of a transfer function.

The ascertained pipe wall resonance frequencies can especially, however, not exclusively, be utilized for correction of an ascertained flow rate and/or an ascertained flow velocity and/or for other evaluations, e.g. for predicting an advantageous measuring point, for maintenance and/or self calibration of the ultrasonic, flow measuring device and the like.

Advantageous embodiments of the invention are subject matter of the dependent claims.

The providing of the transfer function according to step I describes advantageously a change of an acoustic level at a coupling surface of the first ultrasonic transducer with the pipeline as a function of a determined frequency of the input voltage, with which a sound producing element of the ultrasonic transducer is operated.

Advantageously, the field device of process measurements technology has at least one data memory and the transfer function of the first or the plurality of ultrasonic transducers is stored callably in the data memory.

Additionally advantageously, the providing of the transfer function of two ultrasonic transducers occurs by ascertaining a total transfer function, in that the ultrasonic transducers are connected on their coupling surfaces with one another. The total transfer function describes, thus, the propagation of the sound signal through the first and second ultrasonic transducers.

This can be furnished either in a data memory or on-site, thus ascertained, especially measured, during the installation, as a substep before the mounting on the pipe.

For ascertaining the received spectrum, advantageously, a transmission of an ultrasonic signal by a sound producing element of the first ultrasonic transducer can occur, wherein the signal propagates at least through the ultrasonic transducer, at least twice through a pipe wall of the pipeline, through the measured medium and a second time through the first or through a second ultrasonic transducer, and is received by the sound producing element of the first ultrasonic transducer or by a sound producing element of the second ultrasonic transducer as received signal and is converted into a received spectrum.

Alternatively or supplementally, the ascertaining of the received spectrum can advantageously occur by a transmission of an ultrasonic signal by a sound producing element of the first ultrasonic transducer, wherein the signal propagates exclusively through the ultrasonic transducer, through a pipe wall of the pipeline and through a second ultrasonic transducer, and is received by a sound producing element of a second ultrasonic transducer as received signal and is converted into a received spectrum.

The ascertaining of a transfer function characteristic for the measuring point can advantageously occur by subtracting logarithmic amplitude spectra of the transfer function at least of the first or a plurality of ultrasonic transducers located in the region of the measuring point from the received spectrum.

Additionally advantageously, the ascertaining of the pipe wall resonance frequencies in the region of the measuring point occurs by ascertaining the amplitude maxima of the amplitude spectrum of the transfer function.

A clamp-on, ultrasonic, flow measuring device of the invention includes at least the first ultrasonic transducer and an evaluation unit, to which the first ultrasonic transducer is connected and which is equipped for performing the method.

Advantageously, the evaluation unit is equipped for ascertaining flow rate and/or flow velocity according to a travel-time difference method.

Advantageously, the evaluation unit is equipped, based on the at least one pipe wall resonance frequency, to set an exciter signal for the first ultrasonic transducer, preferably, however, to set a frequency of the exciter signal.

Further according to the invention, a method for ascertaining flow rate or flow velocity by a clamp-on, ultrasonic, flow measuring device is provided, wherein pipe wall resonance frequencies are taken into consideration, and wherein the pipe wall resonance frequencies are ascertained according to the method.

According to the invention, additionally provided is a method for ascertaining changes of a measuring point, to which a clamp-on flow measuring device is secured, wherein a change of the measuring point is displayed, to the extent that the pipe wall resonance frequency or the pipe wall resonance frequencies ascertained in the method exceeds a desired value.

A pipe identification device of the invention for ascertaining pipe wall parameters, especially pipe wall thickness and pipe wall material, includes at least one ultrasonic transducer and an evaluation unit, which is equipped to ascertain from pipe wall resonance frequencies ascertained pipe wall thickness and/or pipe wall material.

BRIEF DESCRIPTION OF THE DRAWINGS

The invention will now be explained in greater detail based on an example of an embodiment and based on the appended drawing, the figures of which show as follows.

DETAILED DISCUSSION IN CONJUNCTION WITH THE DRAWINGS

Clamp-on, ultrasonic, flow measuring devices are known per se. These measuring devices can be used to perform flow determination either based on the travel-time difference principle or according to the Doppler principle. The determination by means of the Doppler principle can be performed with only one ultrasonic transducer, while, in the case of the travel-time difference principle, at least two ultrasonic transducers are applied.

For the flow measurement, exciter signals with a certain excitation frequency are produced. The excitation frequency is most often selected by the flow measuring device itself from a predetermined frequency range and lies often in the region of the center frequency of the ultrasonic transducers being used.

Figure 1A:
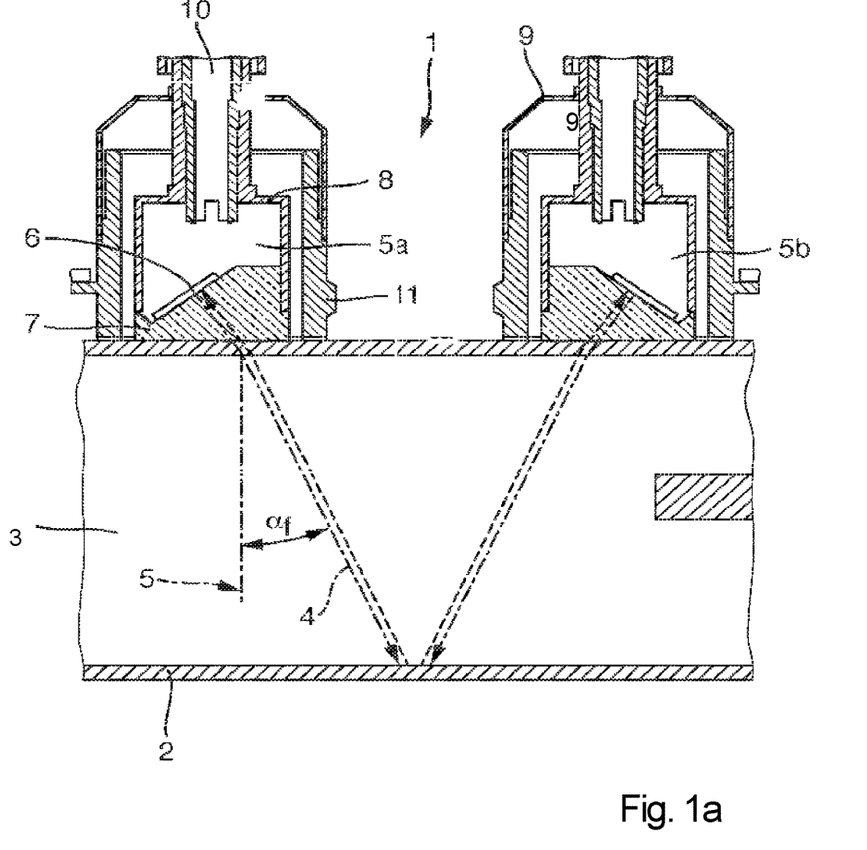
FIG. 1a is a schematic representation of a clamp-on, ultrasonic, flow measuring device.

FIG. 1 shows an arrangement with a clamp-on, ultrasonic, flow measuring device 1 in the installed state on a pipeline 2. Located in the pipeline 2 is a measured medium 3, which ideally flows through the pipeline 2 in the stream, or flow, direction S.

The schematically shown clamp-on, ultrasonic, flow measuring device 1 is composed preferably of two ultrasonic transducers 5a and 5b, which are placed externally on the measuring pipe and connected releasably or non-releasably with the pipeline 2. The illustrated variant concerns a two-traverse arrangement. However, other arrangements are possible, e.g. a one-traverse arrangement.

The ultrasonic transducer 5a shown in FIG. 1 is mounted by means of a holding element 11 for securing the ultrasonic transducer 5a on the pipeline 2. The holding element 11 and the ultrasonic transducer 5a are part of an ultrasonic transducer arrangement. The ultrasonic transducer 5a includes a housing 9, which is connectable with the holding element 11, e.g. frictionally held or by shape interlocking.

A corresponding ultrasonic transducer 5a includes an electromechanical transducer element 6, e.g. a piezoelement, connected via an electrical connection, e.g. a cable, with an evaluation unit (not shown). The corresponding connection is, in such case, led away from the electromechanical transducer element 6 e.g. through a cylindrical cable guide 10 having a longitudinal axis perpendicular to the pipeline 2.

Ultrasonic transducer 5a additionally includes between the electromechanical transducer element 6 and the pipeline 2 a coupling body 7, which has a bearing surface against the pipe of the pipeline 2 and an area tilted relative to this bearing surface for arrangement of the electromechanical transducer element 6.

For ascertaining a flow rate or a flow velocity during the measuring, the clamp-on, ultrasonic, flow measuring device, especially the electromechanical transducer element 6 of the ultrasonic transducer 5a, transmits an ultrasonic signal with dominant transmission frequency $f_{ex}$, and this signal is received by the ultrasonic transducer 5b.

The measuring occurs according to the travel-time difference principle. Therefore, ultrasonic signals are transmitted and received once inclined in, and once inclined counter to, the flow direction S.

For the choice of the excitation frequency $f_{ex}$ of the electromagnetic transducer element 6, it is known to use the center frequency of the transducer element 6.

Figure 2:
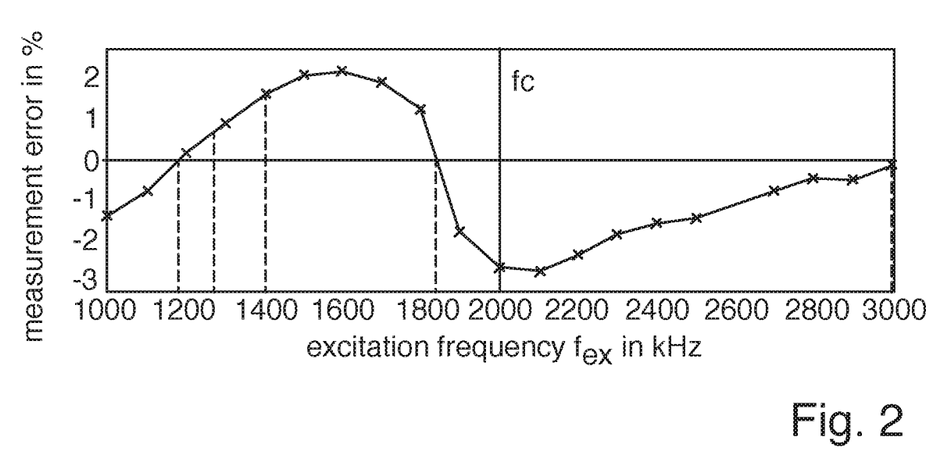
FIG. 2 is a graphic example of frequency dependent measurement error.

It has been found, however, that the center frequency as excitation frequency is not always the optimal choice for the operation of an ultrasonic, flow measuring device. FIG. 2 is a graph of how the measurement error changes in the frequency range of an ultrasonic transducer. The curve was ascertained for a rotary plant, e.g. a bottling plant, in the case of a volume flow of 20 l/s. The two ultrasonic transducers of the clamp-on system were secured on a DN80 pipe of steel with a pipe wall thickness of 2 mm. The center frequency $f_c$ was 2 MHz. As can be seen, the relative measurement error in the region of the center frequency is relatively high in the case of this arrangement.

It has been found that the pipe wall of the pipeline influences the measurement error. Even in the case of pipe walls of identical material, the measurement error can vary as a function of pipe wall thickness.

It is, consequently, important to gain information concerning the exact pipe wall thickness, as well as also the material properties of the pipeline, on which the clamp-on, ultrasonic, flow measuring device is mounted. In such case, mechanical bending modes of the pipe wall, also referred to as Rayleigh-Lamb waves, are significant. A best possible choice of the electrical exciter signal can lead to measurement with small errors. For this, however, knowledge of the nearest pipe wall resonance frequencies $f_{res}$ is required.

These pipe wall resonance frequencies, thus these mechanical modes, can be ascertained meteorologically in the context of the present invention.

The method for ascertaining at least one pipe wall transmission frequency includes steps as follows:

I ascertaining a transfer function $U_{transducer}(f)$ of one or more ultrasonic transducers II ascertaining a received spectrum $U_{rec}(f)$ of a received signal $U_{rec}(t)$ following transmission of an ultrasonic signal $u_{ex}(t)$ with excitation frequency $f_{ex}$;

III ascertaining a transfer function, which is characteristic for the measuring point; and IV ascertaining the at least one pipe wall resonance frequency or a plurality of pipe wall resonance frequencies.

The respective method steps will now be developed as follows:

In a first method step I, the ascertaining of a transfer function of at least one ultrasonic transducer installed in the clamp-on flow measuring device occurs. The transfer function of an ultrasonic transducer in the sense of the present invention corresponds to the frequency dependent, directional characteristic of the ultrasonic transducer. This includes, among other things, the frequency- and angle dependent amplitude of the wave propagation/-radiation at a certain temperature. The angular dependence relates to the angle of incidence of the ultrasonic signal into the pipe, i.e. into the pipeline.

Figure 3:
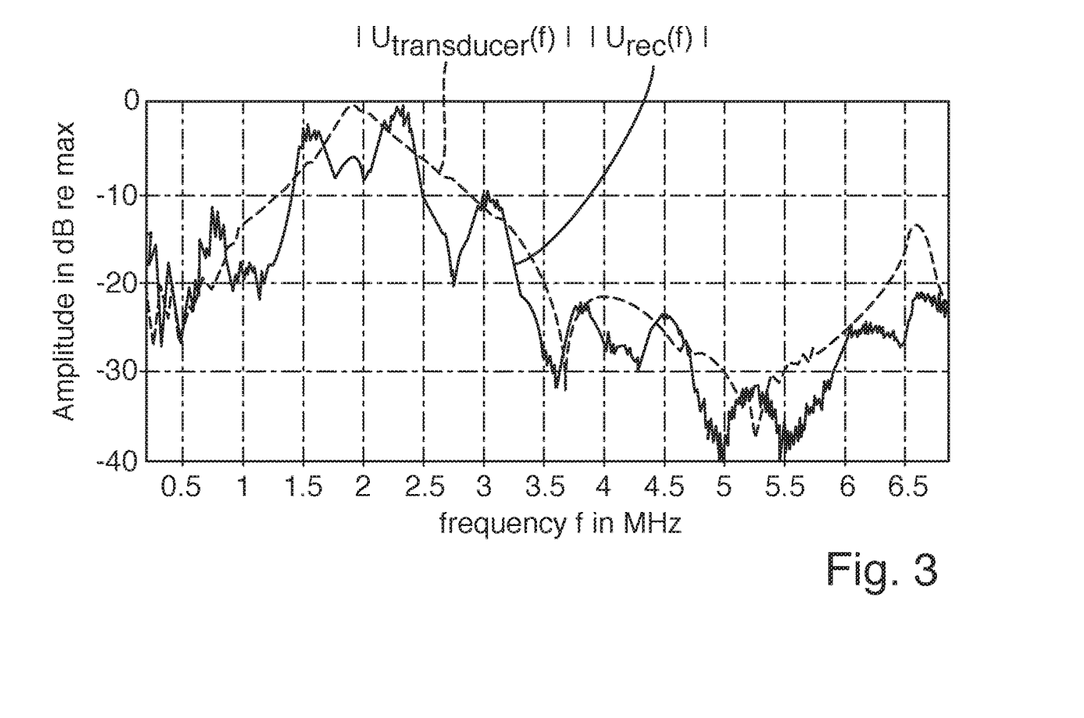
FIG. 3 is a graph of an amplitude spectrum of a received signal and a transfer function of a particular ultrasonic transducer.

Of course, in the case of a number of ultrasonic transducers, the transfer function must be ascertained for each of these transducers. This function is shown in FIG. 3 e.g. as signal amplitude referenced, i.e. normalized, to the maximum in decibel versus frequency in MHz. Involved in the function are all the ultrasonic signal influencing factors of the ultrasonic transducer, thus e.g. the material properties of the respective matching- and coupling layers, the material properties of the exciting transducer element, e.g. a piezoceramic, and many other factors. The transfer function does not change, consequently, at constant temperature, independently of the pipe to which the ultrasonic transducer is connected.

Thus, the transfer function of an ultrasonic transducer can be determined in a plant and be furnished in a data memory of an evaluation unit of the clamp-on, ultrasonic, flow measuring device. As a result, the transfer function can be furnished in the measuring device concurrently with delivery. Since, however, the medium in the pipeline, depending on application, will have a different temperature, also a number of transfer functions for a number of temperature ranges can be furnished. By ascertaining the temperature, for example, using a temperature sensor integrated in the ultrasonic transducer, the clamp-on, ultrasonic, flow measuring device can independently select an appropriate transfer function for a temperature range or interpolate between two transfer functions to provide an approximation for the ascertained temperature.

Alternatively, the temperature can also be estimated, for example, based on the travel time of the signal.

Alternatively, the ascertaining of the transfer function of an ultrasonic transducer can also occur during start-up of the ultrasonic, clamp-on device at its location of use. To the extent that the clamp-on flow measuring device has two or more ultrasonic transducers, these can be held together. In such case, preferably the sound in-coupling surfaces, with which the transducers are placed on the pipe, i.e. the pipeline, lie against one another. In given cases, a centering adapter can be utilized. The evaluation unit ascertains, based on an emitted signal, e.g. a pulse, a total transfer function of the two ultrasonic transducers.

In the case of a measuring according to the travel-time difference method with two ultrasonic transducers, basically, the logs of the individual transfer functions of the two ultrasonic transducers must be added. This step of separate addition can advantageously be omitted in the case of ascertaining the total function of the two ultrasonic transducers.

In both cases, thus ascertainment at the factory and ascertainment on-site, especially preferably, a correction of the amplitude spectrum of the received signal by the exciter signal $u_{ex}(t)$ can occur. The received signal and the exciter signal can preferably be converted by Fourier transformation for calculations. By subtracting the logs of the amplitude spectra, thus the excitation spectrum, from the received spectrum, one obtains the received spectrum cleaned of the exciter signal, and, thus, the transfer function.

In a second method step II, a received signal is registered. In such case, two variants are distinguished.

In a first variant, the received signal can be a conventional measurement signal, such as is received in standard measurement operation of an ultrasonic transducer. In such case, excitation is by an ultrasonic transducer in the transmission mode with an exciter signal $u_{ex}(t)$.

To the extent that the flow measurement occurs according to the Doppler principle, then the measurement signal can, as received signal, be received by the same ultrasonic transducer, which, after transmitting the measurement signal, switches into the receiving mode.

To the extent that the travel-time difference principle is utilized, then the measurement signal, as received signal, is received by an additional ultrasonic transducer in the receiving mode. The transducer element of an ultrasonic transducer, e.g. a piezo crystal, is, in such case, excited with a certain excitation frequency $f_{ex}$ for transmitting a soundwave packet. This propagates through the individual layers of the transducer, e.g. through the so-called lead-in element, to an in-coupling surface, which contacts the pipe. At this point, the soundwave packet passes as measurement signal via the pipe wall into the measured medium, traverses the measured medium, traverses the pipe wall a second time and is received by the additional ultrasonic transducer. From this consideration of the signal path, it becomes clear that the measurement signal and, thus, also the measurement error associated therewith are determined by the influence of the two ultrasonic transducers, the pipe wall and the fluid. To the extent that it is not a strongly damping measured medium, such as e.g. oil, the influence of the measured medium can be neglected.

Figure 1B:
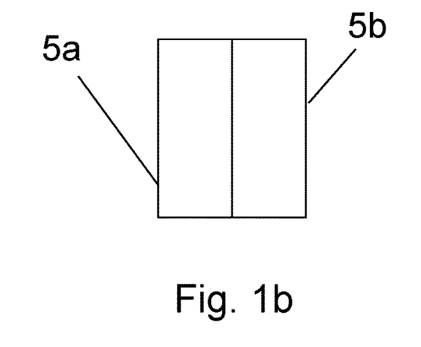
FIG. 1b is a schematic representation, according to the present disclosure, wherein the transducers are positioned for measuring of the total transfer function.
Figure 1C:
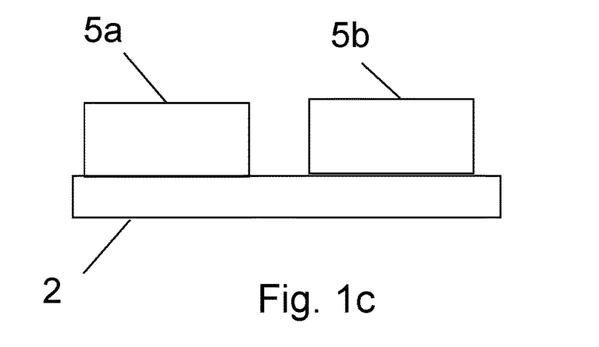
FIG. 1c is another schematic representation of the transducers, shown positioned spaced from each other on the measuring tube.

Alternatively, in a second variant of the registering of a received signal II, a possible disturbing influence of the measured medium, especially in the case of measuring strongly ultrasonic-damping fluids, can also be meteorologically excluded. This occurs by registering the received signal $U_{rec,\ body\ sound}(t)$ via a so-called body sound measurement. This can especially preferably be applied in the case of measuring with two ultrasonic transducers, in the case of a 2-traverse measurement, such as shown in FIG. 1, since the sound transmitted by the first ultrasonic transducer propagates via the pipe wall directly to the second ultrasonic transducer, which is located in the receiving mode. In such case, the sound is not influenced by the fluid, since it is transmitted via the pipe wall.

In the case of the two aforementioned variants of registering a received signal, the received signal can be advantageously cleaned of the influence of the known exciter signal, preferably analogously to the first method step I.

FIG. 3 shows an amplitude spectrum of the received signal as a continuous line and an amplitude spectrum of the transfer function of two ultrasonic transducers as a dashed line.

There follows in a method step III an ascertaining of a transfer function characteristic for the measuring point. This includes at least one pipe wall transfer function, thus an acoustic spectrum of amplitude versus frequency. In given cases, especially in the case of strongly sound damping media, also the transfer function of the measured medium can be taken into consideration in the ascertaining of the transfer function characteristic for the measuring point.

The amplitude spectrum with continuous line includes the influence of two ultrasonic transducers, the pipe wall and, depending on variant, also the influence of the fluid.

By simple subtraction of the log spectra, one obtains the transfer behavior of the system, minus the influence of the exciter signal and the ultrasonic transducers, thus the pipe wall transfer function, in which, in given cases, also the transfer function of the fluid enters. This is the case, however, only in the first variant of registering the received signal:

$$20\ \log_{10}|U_{measuring\ point}(f)| = 20\ \log_{10}(|U_{rec}(f)|) - 2*20\ \log_{10}(|U_{transducer}(f)|) - 20\ \log_{10}(|U_{ex}(f)|)$$

wherein $|U_{rec}(f)|$ corresponds to the complex valued Fourier transform of a received signal $u_{rec}(t)$, which received signal was registered via a body sound transmission through the pipe or via a fluid path with n traverses, wherein n is a whole number;

wherein $|U_{transducer}(f)|$ corresponds to the amplitudes of the frequency- and angle dependent, directional characteristics for per frequency dominant angle or angle of emergence of the transducers, and wherein $|U_{ex}(f)|$ corresponds to the amplitude spectrum of the exciter signal $u_{ex}(t)$ and wherein $|U_{measuring\ point}(f)|$ corresponds to the influence of the pipe wall or the influence of pipe wall and fluid damping.

The performing of this calculating enables supplementally the determining of fluid-properties based on frequency dependent damping. The size of this damping is characteristic in the case of high viscosity fluids (e.g. oils) and suggests the determining of dynamic viscosity.

If the fluid has no strong frequency dependent damping (e.g. water), then in the case of both variants, the calculated spectrum of the measuring point corresponds to the pipe wall transfer function $|U_{pipe\ wall}(f)|$.

Figure 4:
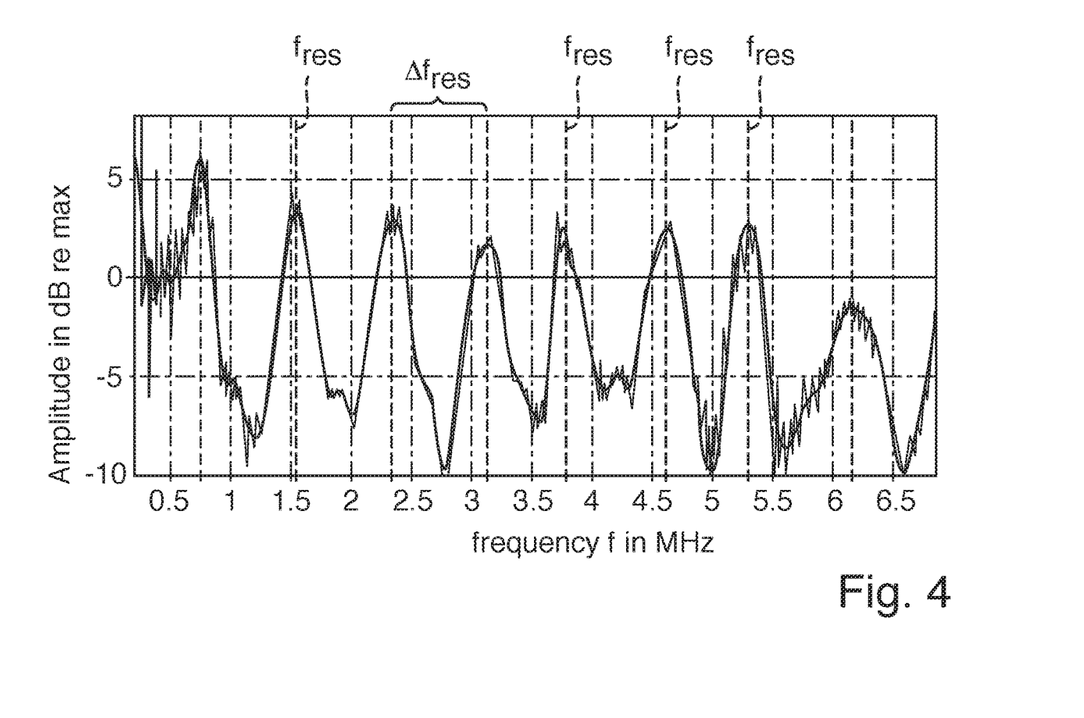
FIG. 4 is a transfer function of pipe wall and pipe wall resonance frequencies ascertained therefrom.

FIG. 4 shows a corresponding transfer function, which is characteristic for a measuring point. The maxima of the amplitude spectrum correspond to pipe wall resonance frequencies. The determining of these pipe wall frequencies, e.g. by reading them off, represents method step IV, thus the ascertaining of the at least one pipe wall resonance frequency or a plurality of pipe wall resonance frequencies. This holds also in the case of strongly damping fluids, to the extent that the fluid damping rises or falls monotonically, which is most often the case for liquids.

Cases, in which pipe wall resonance frequencies ascertained according to the method of the invention can be applied, will now be discussed in greater detail.

The pipe wall resonances are characteristic for the material properties of the pipeline. They can be applied for correcting measuring error in the case of ultrasonic, flow measurement.

The pipe wall resonance frequencies can also be utilized, in order to detect changes at the measuring point, such as e.g. temperature influence, deposits, hydroabrasion and the like, on or in the pipe wall.

Additionally, a checking can occur based on the pipe wall resonance frequencies, whether values for pipe wall thickness and pipe material known to the user are appropriate. Likewise based on the pipe wall resonance frequencies, calculation of the actual pipe wall thickness can occur, using input of material parameters.

Pipe wall thickness at the measuring point is, most often, subject to a certain amount of uncertainty, since a customer cannot, as a rule, measure the exact geometric dimension for a given pipe outer diameter. This uncertainty enters directly into the calculating of the flow velocity and therewith into the measurement error. Based on pipe wall resonance frequencies and the pipe outer diameter, the pipe inner diameter can be ascertained.

The publication "Study of Lamb waves based upon the frequency and angular derivatives of the phase of the reflection coefficient" by Lenoir (Journal of the Acoustical Society of America, vol. 94, No. 330, 1993) gives the following relationship:

$$\Delta f_{res} = \frac{c_{t,Pipe}}{2d_w \cdot \sqrt{1 - \left[\left(\frac{c_{t,Pipe}}{c_{Fluid}}\right)\sin\alpha_f\right]^2}},$$

wherein, at known temperature, the pipe wall thickness is $d_w$, the propagation angle of the ultrasonic signal in the fluid is $\alpha_f$, the longitudinal velocity of sound in the fluid is $c_{fluid}$ and the transverse velocity of sound within the pipe wall is $c_{t,pipe}$.

Pipe wall properties in the sense the present invention are, among other things, the transverse velocity of sound and/or the longitudinal velocity of sound.

By solving the equation for $d_w$, the pipe wall thickness can be determined in the case of known angle, fluid velocity of sound and known pipe wall properties, especially in the case of known transverse velocity of sound. Knowing the outer diameter of the pipeline and the pipe wall thickness, then an exact inner diameter of the pipeline can be calculated for ascertaining flow at the measuring point.

Alternatively, also the pipe wall properties can be ascertained in the case of known pipe wall thickness.

From the pipe wall properties, it can be checked e.g. based on desired value comparison, whether the specified pipe material is actually present. The same holds for the pipe wall thickness, e.g. in the case of progressive abrasion, by comparison with earlier ascertained pipe wall resonance frequencies.

The proposed method can also form the basis for a new identification device, which ascertains targeted pipe wall parameters by analysis of body sound.

In such case, a construction by way of example is composed of two angle test heads, which can be mounted with defined separation in a housing on a line on the pipe parallel to the pipe axis, analogously to a two-traverse arrangement of two ultrasonic transducers.

If this device is placed on a pipe wall with unknown geometry/material properties, then a measurement transmitter connected thereto ascertains, based on the above described idea, the pipe wall resonance frequencies. The defined separation between the two transducers permits supplementally via a travel-time measurement the determining of the pipe wall material properties by evaluating the velocity of sound.

An option for how to proceed in determining the pipe wall material properties lies in the solution of an inversion problem, such as described, for example, in "Inversion of leaky Lamb wave data by simplex algorithm" by Karim, Mal and Bar-Cohen (Journal of the Acoustical Society of America, vol. 88, No. 1, 1990) as applied to plates. In this regard, the signals $U_{rec,body\ sound}(t)$ directly received via the pipe wall are evaluated and compared with model calculations. The parameters, especially material properties, of the model are adapted until the deviation between the signal calculated by the model and the measured, received signal is minimum.

The identification device can, consequently, be used to ascertain both the pipe wall thickness as well as also the pipe wall properties.

Alternatively to the addition/subtraction of log variables, also the multiplication/division of non-log variables can equivalently be used.

The invention claimed is:

1. A method for ascertaining at least one pipe wall resonance frequency of a pipeline in a region of a measuring point using a field device of process measurements technology having at least a first ultrasonic transducer and a second ultrasonic transducer, which are placed on the pipeline at the measuring point, comprising steps as follows:
   wherein a substep before placing the transducers on the pipeline includes providing a first transfer function $U_{transducer}(f)$ by ascertaining a total transfer function, in that the first ultrasonic transducer and the second ultrasonic transducer are connected on their coupling surfaces with one another and the coupling surfaces are pressed against one another where a propagation of a sound signal through the first ultrasonic transducer and the second is recorded as a total transfer and converted into the frequency domain to become the first transfer function $U_{transducer}(f)$;
   positioning the first ultrasonic transducer and the second ultrasonic transducer spaced apart along the pipeline;
   providing the first transfer function $U_{transducer}(f)$ of the first ultrasonic transducer and the second ultrasonic transducer located in the region of the measuring point;
   wherein the first ultrasonic transducer and the second ultrasonic transducer each comprise a coupling body with the coupling surface for contacting the pipeline,
   ascertaining a received spectrum $U_{rec}(f)$ from a received signal $U_{rec}(t)$ after transmission of an ultrasonic signal;
   ascertaining a second transfer function $U_{measuring\ point}(f)$ from the first transfer function $U_{transducer}(f)$ of the first or both of the ultrasonic transducers and from the received spectrum $U_{rec}(f)$, wherein the second transfer function $U_{measuring\ point}(f)$ is characteristic for the measuring point, wherein the second transfer function $U_{measuring\ point}(f)$ is determined by the sound transmission behavior of the pipeline; and
   ascertaining for the pipeline having a pipe wall at least one pipe wall resonance frequency $f_{res}$, in the region of the measuring point by evaluating the second transfer function $U_{measuring\ point}(f)$;
   wherein the transfer functions are an acoustic spectrum of amplitude vs. frequency.

2. The method as claimed in claim 1, wherein said providing step of the first transfer function $U_{transducer}(f)$ comprises a temperature and an angle independent frequency response; said angle independent frequency response refers to the angle of incidence of the ultrasonic signal from the ultrasonic transducer into the pipeline.

3. The method as claimed in claim 1, wherein the field device of process measurements technology has at least one non-transitory data memory; and the first transfer function $U_{transducer}(f)$ of the first or both of the ultrasonic transducers is stored callably in the non-transitory data memory.

4. The method as claimed in claim 1, wherein a plurality of first transfer functions $U_{transducer}(f)$ are provided for a number of temperatures or temperature ranges, and are stored in a non-transitory data memory.

5. The method as claimed in claim 1, wherein for ascertaining a received spectrum $U_{rec}(f)$ from a received signal $U_{rec}(t)$ after transmission of an ultrasonic signal, a transmission of an ultrasonic signal by a sound producing element of the first ultrasonic transducer occurs; the signal propagates at least through one of the first and second ultrasonic transducers, at least twice through the pipe wall of the pipeline, through a fluid medium in the pipeline and a second time through the first or through the second ultrasonic transducer, and is received by the sound producing element of the first ultrasonic transducer or by a sound producing element of the second ultrasonic transducer as a received signal and is converted into the received spectrum $U_{rec}(f)$.

6. The method as claimed in claim 1, wherein for ascertaining a received spectrum $U_{rec}(f)$ from a received signal $U_{rec}(t)$ after transmission of an ultrasonic signal, a transmission of an ultrasonic signal by a sound producing element of the first ultrasonic transducer occurs; the signal propagates exclusively through at least one of the first and second ultrasonic transducers, through the pipe wall of the pipeline and the second ultrasonic transducer, and is received by a sound producing element of a second ultrasonic transducer as received signal and converted into the received spectrum $U_{rec}(f)$.

7. The method as claimed in claim 1, wherein: the ascertaining of the second transfer function $U_{measuring\ point}(f)$, which is characteristic for the measuring point, occurs by subtracting logarithmic amplitude spectra of the first transfer function $U_{transducer}(f)$ at least of the first or both of the ultrasonic transducers located in the region of the measuring point from the received spectrum $U_{rec}(f)$.

8. The method as claimed in claim 1, wherein: the ascertaining of the pipe wall resonance frequency $f_{res}$ in the region of the measuring point occurs by ascertaining an amplitude maxima of an amplitude spectrum of the second transfer function $U_{measuring\ point}(f)$.

9. The method of claim 1, further comprising:
   a clamp-on mounting for the first and second ultrasonic transducer to the pipeline, and an evaluation unit, connected to at least one of the first and second ultrasonic transducers configured to perform the providing and ascertaining steps.

10. The method of claim 9, wherein said evaluation unit is equipped for ascertaining at least one of flow rate and flow velocity according to a travel-time difference method.

11. The method of claim 9, wherein said evaluation unit generates an exciter signal for at least one of the first and second ultrasonic transducers based on the at least one pipe wall resonance frequency.

12. The method of claim 1, wherein an evaluation unit, ascertains the pipe wall resonance frequencies $f_{res}$; and wherein the evaluation ascertains unit flow rate or a flow velocity of a fluid medium.

13. The method of claim 1, wherein the ascertained pipe wall resonance frequency provides at least one of amplitude and position in the spectrum to generate the second transfer function $U_{measuring\ point}(f)$ and a point is displayed along with a displayed desired value point where the difference between the points exceed and/or subcede is also displayed.

14. The method as claimed in claim 1, wherein an evaluation unit for ascertaining pipe wall parameters is equipped to ascertain from the ascertained pipe wall resonance frequency at least one of a pipe wall thickness and a pipe wall material.

\* \* \* \* \*